(12) United States Patent
Georgis et al.

(10) Patent No.: US 6,707,550 B1
(45) Date of Patent: Mar. 16, 2004

(54) WAVELENGTH MONITOR FOR WDM SYSTEMS

(75) Inventors: Steven P. Georgis, Boulder, CO (US); Robert T. Weverka, San Mateo, CA (US)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 09/551,256

(22) Filed: Apr. 18, 2000

(51) Int. Cl.$^7$ .................................................. G01J 3/28
(52) U.S. Cl. ........................................ 356/326; 356/328
(58) Field of Search ................................. 356/326, 328; 359/130

(56) References Cited

U.S. PATENT DOCUMENTS

| | | | |
|---|---|---|---|
| 4,775,216 A | 10/1988 | Layton | 350/96.29 |
| 5,414,540 A | 5/1995 | Patel et al. | 359/39 |
| 5,745,270 A | 4/1998 | Koch | 359/124 |
| 5,745,271 A | 4/1998 | Ford et al. | 359/130 |
| 5,748,811 A | 5/1998 | Amersfoort et al. | 385/15 |
| 5,796,479 A * | 8/1998 | Derickson et al. | 356/326 |
| 5,875,026 A | 2/1999 | Kim et al. | 356/121 |
| 5,896,201 A | 4/1999 | Fukushima | 356/394 |
| 5,898,502 A | 4/1999 | Horiuchi et al. | 356/416 |
| 5,912,748 A | 6/1999 | Wu et al. | 359/117 |
| 5,969,834 A | 10/1999 | Farber et al. | 359/110 |
| 6,002,822 A | 12/1999 | Strasser et al. | 385/2 |
| 6,014,482 A | 1/2000 | Laude | 385/31 |
| 6,191,860 B1 * | 2/2001 | Klinger et al. | 356/419 |
| 6,204,946 B1 | 3/2001 | Aksyuk et al. | 359/124 |
| 6,240,109 B1 * | 5/2001 | Shieh | 372/18 |
| 6,278,535 B1 * | 8/2001 | Shanton, III | 359/124 |
| 6,404,492 B1 * | 6/2002 | Xu et al. | 356/326 |

FOREIGN PATENT DOCUMENTS

| | | | |
|---|---|---|---|
| GB | 2 202 404 | 3/1987 | H04B/9/00 |
| JP | 62-75415 | 4/1987 | G02B/27/28 |
| JP | 62-90042 | 4/1987 | H04B/9/00 |

* cited by examiner

Primary Examiner—Zandra Smith
(74) Attorney, Agent, or Firm—Townsend and Townsend and Crew LLP

(57) ABSTRACT

A method of monitoring input light having a plurality of spectral bands (wavelength channels) includes the following, carried out for at least two different spectral bands at different times, using a common photodetector and wavelength-monitoring circuit that is coupled to the photodetector: separating one of the spectral bands from the plurality of spectral bands, directing light in only that spectral band to the photodetector, and generating, with the wavelength-monitoring circuit, a signal representing a quality characteristic of a modulated or unmodulated pattern of light in that spectral band. Each of the plurality of spectral bands can be individually and sequentially monitored in round-robin fashion, each of a subset of the spectral bands can be individually and sequentially monitored in round-robin fashion (to provide selective wavelength monitoring), or the monitoring can be ad hoc in response to external requirements. If desired, the opitcal power of the plurality of spectral bands can be monitored by directing the light in the spectral bands other than the band that has been separated from the plurality to an additional common photodetector and a common power-monitoring circuit.

30 Claims, 2 Drawing Sheets

WAVELENGTH MONITOR FOR WDM SYSTEMS

CROSS-REFERENCES TO RELATED APPLICATIONS

This application claims subject matter related to that disclosed in pending U.S. application Ser. No. 09/442,061, filed Nov. 16, 1999, of Robert T. Weverka, Steven P. Georgis, and Richard S. Roth, entitled "Wavelength Router," the disclosure of which, including all attachments, is incorporated by reference in its entirety for all purposes.

BACKGROUND OF THE INVENTION

This application relates generally to fiber optics and more specifically to techniques and devices for monitoring signals in multi-wavelength fiber optic communication channels.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data The carrying capacity of a fiber is multiplied by the number of DWDM channels used. Today DWDM systems employing up to 80 channels are available from multiple manufacturers, with more promised in the future.

At each end of a multi-wavelength optical link are wavelength multiplexers and demultiplexers. A wavelength multiplexer (wavelength combiner) combines the light from multiple fibers, each carrying light of different wavelength band, onto the single fiber. A wavelength demultiplexer (wavelength splitter) performs the reverse operation by directing light on the single fiber, which carries light in each of a plurality of wavelength bands, onto separate fibers for each band. Such devices are generally reversible, functioning as a wavelength multiplexer in one direction and as a wavelength demultiplexer in the other direction.

It is necessary in the operation of fiber optic networks to monitor one or more parameters of each of the signal channels in order to detect potential problems and initiate corrective measures. A typical approach is to measure the signal quality of each optical channel at a location where the individual wavelengths have already been demultiplexed into separate fibers, and the optical signals on the separate fibers converted to electrical signals using suitable photodetectors. A portion of the electrical signal is tapped off and communicated to suitable high-speed electronic circuitry for monitoring the desired parameters for that signal's corresponding wavelength channel. Typical measures of optical signal quality include signal-to-noise ratio, bit error rate, optical power level, and optical wavelength center frequency. Additionally, certain signal protocols (e.g., SONET, which stands for synchronous optical network, and which uses time division multiplexing) provide information within the digital signal stream relating to signal quality. The various techniques for monitoring optical signal quality are well known and are in widespread commercial use.

Thus the wavelength-monitoring circuitry would be deployed in association with the transmission equipment, or at other locations where the signals are already wavelength demultiplexed and converted to electrical signals, such as at a regenerator or optical cross-connect system (OXC). As is known, a regenerator (also known as a repeater) performs optical-to-electrical conversion of each channel, followed by electrical signal amplification, shaping, or other conditioning, followed by electrical-to-optical conversion and subsequent wavelength multiplexing. Similarly, an OXC typically converts the optical wavelengths to electrical signals in order to perform the cross-connection function in the electrical domain. While in the electrical domain, it is possible to monitor the quality of the optical signal transmission. However this approach is limited to systems where expensive optical-to-electronic-to-optical (O-E-O) conversion is used in the transmission path. Newer fiber optic network architectures avoid such O-E-O conversion.

Possibly in recognition of this potential limitation, an alternative prior art approach is to tap a small fraction of the light off the fiber (at any desired location along the link), demultiplex the different wavelength channels onto individual fibers, convert each of the optical signals into electrical signals using suitable photodetectors, and communicate each of the electrical signals to suitable wavelength-monitoring circuitry. However, this technique, while providing additional flexibility, requires the replication of the photodetectors and high-speed electronic circuitry for each wavelength channel, adding cost and complexity to the system.

A third approach is to tap a small fraction of the light off of the fiber, pass the light through and optical train which includes a dispersive element, such as a diffraction grating, and image the individual wavelengths onto individual photodetectors. Like the previous approach, the disadvantage of this technique is the high cost of the replicated photodetectors and related high-speed electronic circuitry.

SUMMARY OF THE INVENTION

The present invention provides a cost-effective and versatile technique for monitoring desired signal parameters of multi-wavelength optical links.

In short, a method of monitoring input light having a plurality of spectral bands (wavelength channels) includes the following, carried out for at least two different spectral bands at different times, using a common photodetector and wavelength-monitoring circuit that is coupled to the photodetector: separating one of the spectral bands from the plurality of spectral bands, directing light in only that spectral band to the photodetector, and generating, with the wavelength-monitoring circuit, a signal representing a quality characteristic of a modulated or unmodulated pattern of light in that spectral band.

There is no particular required sequence of monitoring the different bands. For example, each of the spectral bands can be individually and sequentially monitored in round-robin fashion, each of a subset of the spectral bands can be individually and sequentially monitored in round-robin fashion (to provide selective wavelength monitoring), or the monitoring can be ad hoc in response to external requirements. If desired, the optical power of the plurality of spectral bands can be monitored by directing the light in the spectral bands other than the band that has been separated from the plurality to an additional common photodetector and a common power-monitoring circuit.

Apparatus for monitoring input light having a plurality of spectral bands includes an optical train that provides optical paths for routing the spectral bands, a routing mechanism, a photodetector, and a monitoring circuit coupled to said photodetector to provide a signal representing a quality characteristic of a modulated or unmodulated pattern of light impinging on said photodetector. In specific embodiments, the routing mechanism includes a plurality of dynamically configurable routing elements corresponding to the plurality of spectral bands. The optical train may include a dispersive element that intercepts the input light and directs light in respective spectral bands to respective routing elements. Each routing element has a first state causing that routing element to direct its respective spectral band to the photodetector, and a second state causing that routing element to direct its respective spectral band so as not to reach the photodetector.

The apparatus would typically be used with a control circuit that specifies the states of the routing elements. Thus, a given routing element could be commanded to enter its first state, while the remaining routing elements could be commanded to enter their respective second states, thereby resulting in an output signal from the monitoring circuit that represented the quality characteristic of the spectral band associated with the given routing element.

A further understanding of the nature and advantages of the present invention may be realized by reference to the remaining portions of the specification and the drawings.

DESCRIPTION OF SPECIFIC EMBODIMENTS

Wavelength-monitoring Element (WME)

WME Overview

Figure 1:
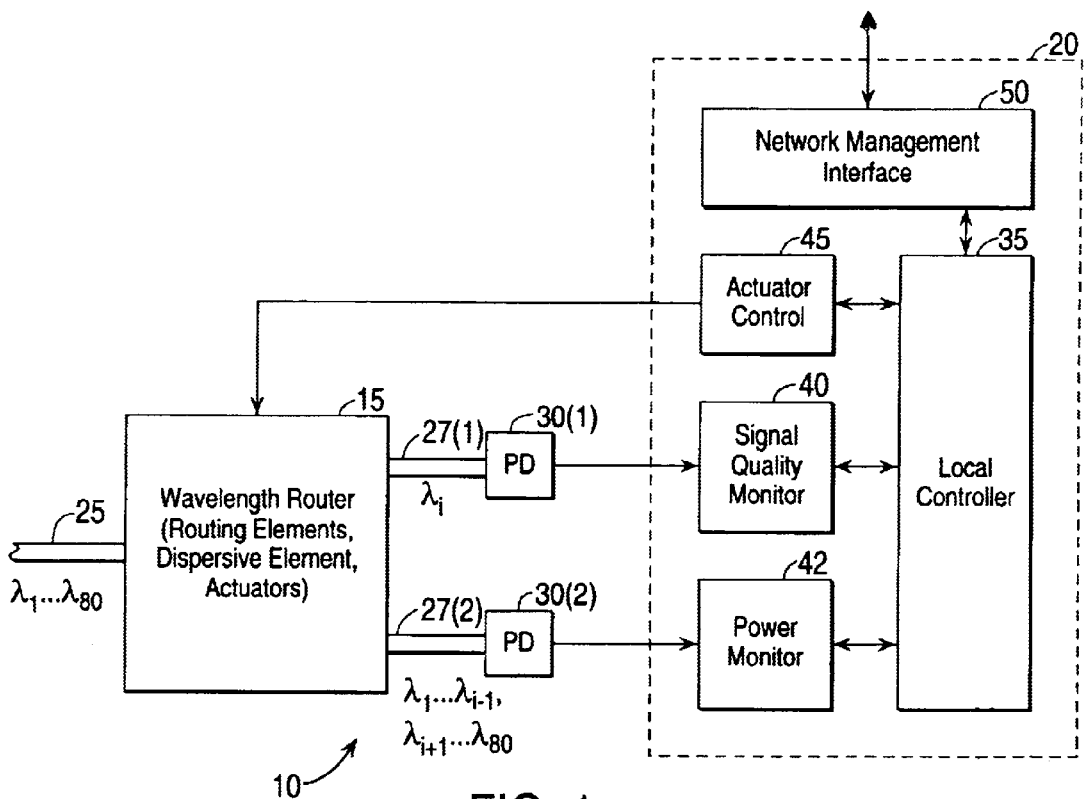
FIG. 1 is a block diagram of a representative wavelength monitoring element (WME)

FIG. 1 is a block diagram of an embodiment of a wavelength-monitoring element (WME) 10. The WME comprises two major subsystems, a wavelength router 15 and wavelength monitoring electronics 20. The input light is represented as including wavelengths designated $\lambda 1 \ldots \lambda 80$ for the specific example where there are 80 wavelength channels (spectral bands).

Although the input light could have a continuous spectrum, adjacent segments of which could be considered different spectral bands, it is generally contemplated that the spectrum of the incoming light will have a plurality of spaced bands, such as those defined by the International Telecommunications Union (ITU) standard wavelength grid. The ITU grid has a frequency band centered at 193,100 GHz, and other bands spaced at 100 GHz intervals around 193,100 GHz. This corresponds to a wavelength spacing of approximately 0.8 rpm around a center wavelength of approximately 1550 nm, it being understood that the grid is uniform in frequency and only approximately uniform in wavelength. The term "spectral band" is sometimes used interchangeably with the term "wavelength," since the bands are narrow relative to their spacing from each other.

Wavelength Router Overview

The general functionality of wavelength router 15 is to accept light having a plurality of (say N) spectral bands at an input port 25 (or multiple input ports), and selectively direct subsets of the spectral bands to desired ones of a plurality of (say M) output ports 27(1 . . . M). In the illustrated embodiment of the WME, N=80 and M=2. A specific implementation will be discussed below.

For the present discussion, it suffices to note that the wavelength router preferably includes a dispersive element, which may be a diffraction grating or a prism, and a routing mechanism. In some embodiments, the routing mechanism includes N routing elements. In such embodiments, the routing elements are multi-state elements whose respective states can be dynamically switched to direct the intercepted spectral band so that it ultimately reaches a desired one of the output ports. The routing elements have associated actuators or other control elements to effect state switching. The actuators have associated actuator control electronics, which will be described below.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

For the application of a WME, wavelength router's output ports 27(1,2) communicate with respective photodetectors 30(1,2). While this communication is shown as suggesting output fibers at the output ports, the photodetectors could equally well be mounted directly at the output ports. Suitable photodetectors include PIN photodiodes or avalanche photodiodes.

Wavelength-monitoring Electronics

The general functionality of wavelength-monitoring electronics 20 is to receive the photodetector signals, perform suitable monitoring of these signals, and control the actuators of the wavelength router so that suitable ones of the spectral bands are monitored. To this end, wavelength-monitoring electronics 20 preferably includes a local controller 35, which can be an embedded microcontroller or a general purpose processor.

In a specific embodiment, there are two monitoring circuits 40 and 42. Circuit 40 receives the electrical signal from photodetector 30(1), and generates an electrical signal representing one or more signal parameters of a single wavelength channel (spectral band). To that end, circuit 40 typically includes a receiving circuit, a clock recovery and timing circuit, and one or more signal quality measurement circuits (these components are well known, and are not shown individually). A common approach to implementing the signal quality measurements is by the use of a programmable digital signal processor (DSP) whose control program implements the measurement algorithms.

The monitored signal parameter or parameters can be any desired characteristic of the modulated (or perhaps unmodulated) pattern of light on a given fiber. It is typically one or more of the following: signal-to-noise ratio, bit error rate, optical power level, optical wavelength center frequency, or specific data patterns (e.g., the "B1" and "B2" error monitoring bytes in the SONET STS-1 frame). Circuit 42 receives the electrical signal from photodetector 30(2), and generates an electrical signal representing the total optical power on the input fiber (subject to a minor qualification discussed below). This provides information regarding signal strength as well as continuity.

The signals from monitoring circuits 40 and 42 are communicated to controller 35, which stores them, communicates them to a higher-level network management application, or further processes them for the purpose of refining the monitoring. For example, controller 35 may store values of the signals over time to perform statistical analysis of the monitored signals.

Wavelength-monitoring electronics 20 further includes actuator control circuitry 45, which provides suitable control signals to the actuators in wavelength router 15. The actuator control circuitry is controlled by controller 35, and could be viewed as an interface between the controller and the wavelength router. The actuator control electronics may include digital switches, power drivers, and digital-to-analog converters. (DACs), which are responsive to a controller, such as a microprocessor, which determines the state of the multi-state elements. The interface between controller 35 and actuator control circuitry 45 can take several common forms, such as a parallel set of control lines or a microprocessor-compatible address/data/control bus.

In some cases, it may be possible to dispense with separate actuator control circuitry. For example, the wavelength router may have interface circuitry that allows the wavelength router to respond to direct commands from controller 35. There is, as a matter of design choice, an inevitable division of labor between wavelength router 15 and wavelength-monitoring electronics 20. The present invention is not limited to any particular apportionment of functionality with respect to the control of the wavelength router actuators. In a current implementation, the wavelength router does not contain any control electronics at all other than simple drivers (actuator electronics). Rather, all of the intelligence and control circuitry is contained within WME electronics 20.

Controller 35 preferably also communicates with other computers in the network environment using standard or proprietary interfaces and protocols. This is shown schematically as a network management interface 50. These other computers are typically executing network management applications.

WME Operation

The general operation of the WME 10 is to cause wavelength router 15 to switch a desired single spectral band to photodetector 30(1) and to switch the remaining spectral bands to photodetector 30(1). This is then typically repeated by switching a different spectral band to photodetector 30(1). When a given spectral band is switched to photodetector 30(1), the desired signal parameter for that spectral band is provided by monitoring circuit 40, while monitoring circuit 42 provides a signal representing the total optical power of the remaining 79 spectral bands. It should be noted that switching from monitoring one spectral band to monitoring another only requires that two of the routing elements change state. If the wavelength router is configured so that only one routing element can be switched at a time, and the routing element for the just-monitored spectral band is switched first, there is an interval between successive monitoring cycles where all 80 spectral bands are directed to photodetector 30(2), so that the total optical power can be measured.

When all bands (e.g., 80) are switched to photodetector 30(2), the total optical power contained in the fiber can be measured and remembered by the controller. Based on this total power measurement, an "alarm" threshold can be calculated as a fraction of the total power level. If the optical power received at the photodetector falls below the alarm threshold, the controller can communicate an alarm condition or a failure condition to the network management application. The alarm threshold calculation takes into consideration that one band is switched to the other photodetector.

The invention is not limited to any specific sequence of monitoring the different spectral bands. A common regime has controller 35 command that each of the plurality of spectral bands be sequentially monitored in round-robin fashion. Alternatively, in situations where different spectral bands are being used for different types of network traffic, with some types of traffic requiring higher quality of transmission (say data as opposed to voice), only a subset of spectral bands need to be monitored. In a further variation, different subsets could be monitored at different frequencies. Further, the monitoring can be entirely ad hoc, with a given spectral band being monitored in response to a diagnostic request.

In any event, if the measurement interval for a single spectral band is on the order of 1 millisecond, the time to monitor all 80 spectral bands is only 80 milliseconds. Thus, substantially full-time monitoring of all channels can be effected with only a single set of monitoring electronics. This makes it economically feasible to monitor multiple signal quality characteristics.

It may also be desired to monitor the optical power of an individual spectral band. While it is possible to provide a separate power monitoring circuit, it is preferred to operate in a mode, on occasion, where only a single spectral band is switched to photodetector 30(2), with the remaining spectral bands being switched to photodetector 30(1).

Wavelength Monitoring System

Figure 2:
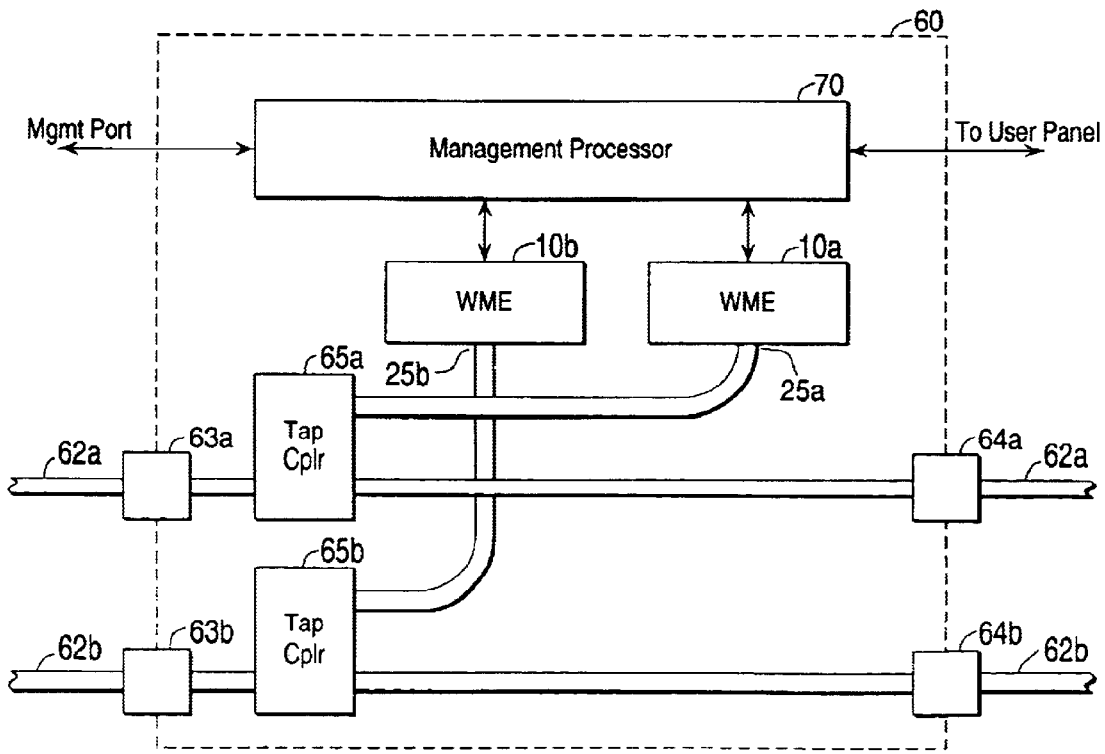
FIG. 2 is a block diagram of a wavelength monitoring system embodying multiple WMEs.

FIG. 2 is a block diagram of a wavelength monitoring system 60 embodying two WMEs, designated 10a and 10b, to allow monitoring signals two fibers, designated 62a and 62b. A typical application would entail monitoring two or four fibers for a bidirectional line switched ring (BLSR). The wavelength monitoring system is shown as a module interposed in the two fiber paths, and as such has two input ports 63a and 63b, and two output ports 64a and 64b.

WMEs 10a and 10b are connected to their respective optical fibers using standard tap couplers 65a and 65b. Each tap coupler has a single input port and first and second output ports, with a small percentage (e.g., 10%) of the optical signal being directed to the first output port and the remaining signal unaltered to the second output port. The respective input ports of tap couplers 65a and 65b are coupled to the respective input ports 62a and 62b of the wavelength monitoring system. The respective input ports 25a and 25b of WMEs 10a and 10b are coupled to the respective first output ports of tap couplers 65a and 65b. The respective second output ports of tap couplers 65a and 65b arc coupled to the respective output ports 64a and 64b of the wavelength monitoring system.

Wavelength monitoring system 60 also includes a management processor 70 coupled to the respective network management interfaces (designated 50 in FIG. 1) of the WMEs. Management processor 70 has interfaces 72 and 75 to a user panel (not shown) and a management port. Management processor 70 is responsible for communicating the measurement data from the WME to other processors in the network. These other processors will typically be running network management applications designed to maintain the configuration, status, and performance of the overall network.

The management processor will also take instructions from the network management applications as to which wavelength bands or sub-bands to monitor. The management processor will in turn instruct the controller in the WME as to which wavelengths to measure. The WME controller performs the function of controlling the state of the individual actuators in the wavelength router. The WME controller then communicates the measurement data to management processor 70 which in turn communicates it to the network management applications.

Wavelength Router Implementation

Figure 3A:
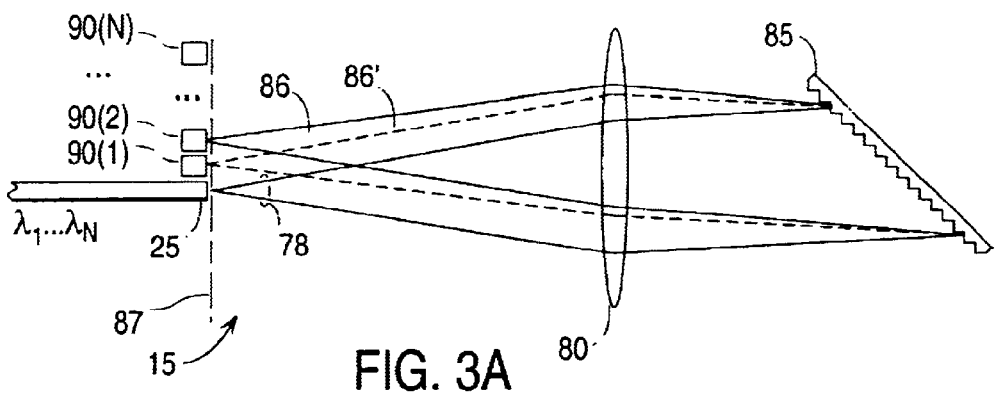
FIGS. 3A–3D show representative implementations of wavelength routers that are suitable for incorporation into the WME.
Figure 3B:
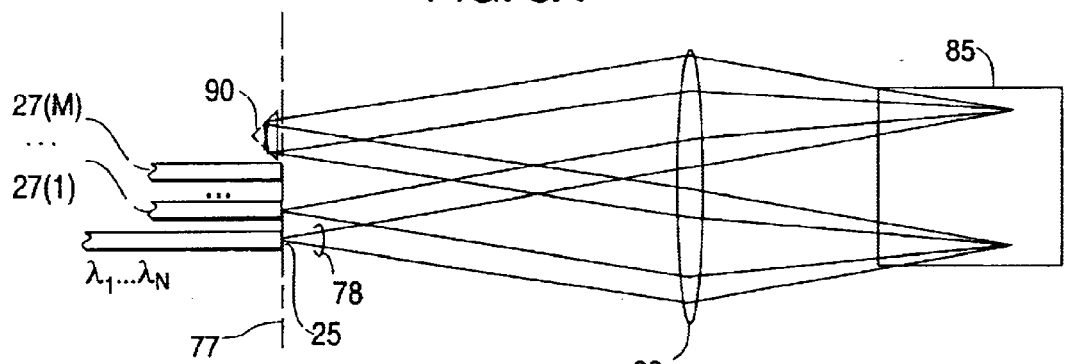
Figure 3C:
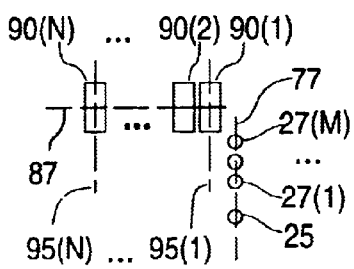

FIGS. 3A, 3B, and 3C are schematic top, side, and end views, respectively, of a possible implementation of wavelength router 15. The output ports, designated 27(1 . . . M), are shown in the end view of FIG. 1C as disposed along a line 77 that extends generally perpendicular to the top view of FIG. 3A. The drawing is not to scale. The drawing is shown generically with N spectral bands and M output ports, but as mentioned above, for use in WME 10, N=80 and M=2.

Light entering wavelength router 15 from input port 25 forms a diverging beam 78, which includes the different spectral bands. Beam 78 encounters a lens 80 which collimates the light and directs it to a reflective diffraction grating 85. Grating 85 disperses the light so that collimated beams at different wavelengths are directed at different angles back towards lens 80. Two such beams are shown explicitly and denoted 86 and 86' (the latter drawn in dashed lines). Since these collimated beams encounter the lens at different angles, they are focused at different points along a line 87 in a transverse focal plane. Line 87 extends in the plane of the top view of FIG. 3A.

The focused beams encounter respective ones of plurality of retroreflectors, designated 90(1 . . . N), located near the focal plane. The beams are directed, as diverging beams, back to lens 80. Each retroreflector sends its intercepted beam along a reverse path that may be displaced in a direction perpendicular to line 87. More specifically, the beams are displaced along respective lines 95(1 . . . N) that extend generally parallel to line 77 in the plane of the side view of FIG. 3B and the end view of FIG. 3C. In the particular embodiment shown in FIGS. 3A–3C, the retroreflectors are rooftop prisms and the displacement of each beam is effected by moving the position of the retroreflector along its respective line 95(i).

The beams returning from the retroreflectors are collimated by lens 80 and directed once more to grating 85. Grating 85, on the second encounter, removes the angular separation between the different beams, and directs the collimated beams back to lens 80, which focuses the beams. However, due to the possible displacement of each beam by its respective retroreflector, the beams will be focused at possibly different points along line 77. Thus, depending on the positions of the retroreflectors, each beam is directed to one or another of output ports 27(1 . . . M).

Figure 3D:
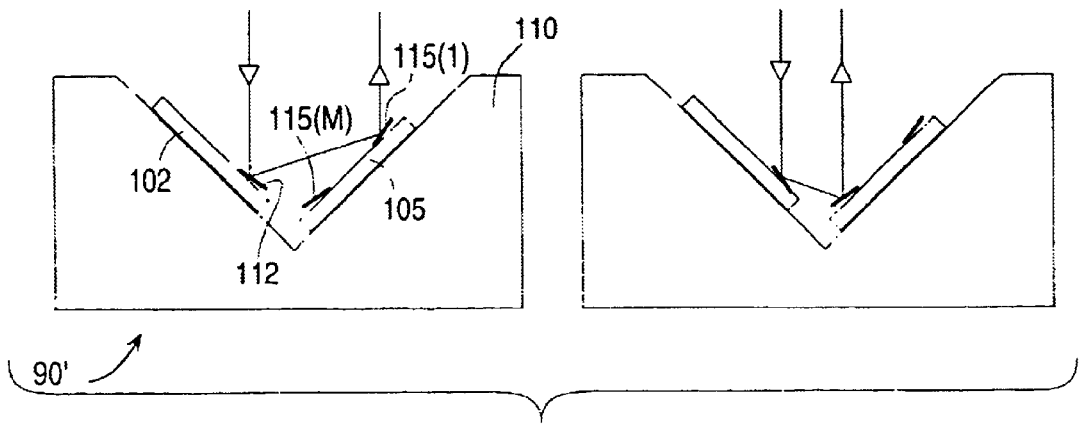

FIG. 3D shows schematically the operation of an alternative retroreflector, designated 90', that uses micromirrors. A pair of micromirror arrays 102 and 105 are mounted to the sloped faces of a V-block 110. A single micromirror 112 in micromirror array 102 and a row of micromirrors 115(1 . . . M) in micromirror array 105 define a single retroreflector. Micrometer arrays 102 and 105 may conveniently be referred to as the input and output micromirror arrays, with the understanding the light paths are reversible. The left portion of the figure shows micromirror 112 in a first orientation so as to direct the incoming beam to micromirror 115(1), which is oriented 90° with respect to micromirror 112's first orientation to direct the beam back in a direction opposite to the incident direction. The right half of the figure shows micromirror 112 in a second orientation so as to direct the incident beam to micromirror 115(M). Thus, micromirror 112 is moved to select the output position of the beam, while micromirrors 115(1 . . . M) are fixed during normal operation.

Micromirror 112 and the row of micromirrors 115(1 . . . M) can be replicated and displaced in a direction perpendicular to the plane of the figure. While micromirror array 102 need only be one-dimensional, it may be convenient to provide additional micromirrors to provide additional flexibility. It is preferred that the micromirror arrays are planar and that the V-groove have a dihedral angle of approximately 90° so that the two micromirror arrays face each other at 90°. This angle may be varied for a variety of purposes by a considerable amount, but an angle of 90° facilitates routing the incident beam with relatively small angular displacements of the micromirrors.

CONCLUSION

In conclusion it can be seen that the present invention provides an elegant and effective approach to wavelength monitoring. Many spectral bands (wavelength channels) can be monitored using a single channel of monitoring circuitry. This lowers the cost, reduces the power consumption, and decreases size of modules.

While the above is a complete description of specific embodiments of the invention, various modifications, alternative constructions, and equivalents may be used.

For example, it should be understood that the invention can be scaled up or down to any number of wavelengths by using the appropriately sized wavelength router. Further, it should also be understood that any wavelength switching technology capable of switching a single wavelength from a multiplexed set of wavelengths can be used in place of the wavelength router. Thus, while the specific embodiments use a wavelength router constructed as described above, and more fully in the above-referenced U.S. patent application Ser. No. 09/442,061 of Robert T. Weverka et al., wavelength routers offering similar functionality can be constructed using other approaches, such as liquid crystal switches. See, for example, U.S. Pat. No. 5,414,540 to Patel et al. and U.S. Pat. No. 5,912,748 to Wu et al.

Therefore, the above description should not be taken as limiting the scope of the invention as defined by the claims.

What is claimed is:

1. A method of monitoring input light having a plurality of spectral bands, the method comprising:

during a first time interval,
  separating a first spectral band of the plurality of spectral bands from the plurality of spectral bands,
  directing the first spectral band to a photodetector while preventing the spectral bands in the plurality of spectral bands other than the first spectral band from reaching the photodetector,
  generating a first power signal representing combined optical power of the spectral bands other than the first spectral band, and
  generating, with a wavelength-monitoring circuit that is coupled to the photodetector, a first signal representing a quality characteristic of a modulated or unmodulated pattern of light in the first spectral band; and thereafter, during a second time interval,
  separating a second spectral band of the plurality of spectral bands from the plurality of spectral bands,
  directing the second spectral band to the photodetector while preventing spectral bands in the plurality of spectral bands other than the second spectral band from reaching the photodetector, and
  generating, with the wavelength-monitoring circuit, a second signal representing the quality characteristic of the modulated or unmodulated pattern of light in the second spectral band.

2. The method of claim 1, where the first and second signals represent, for the first and second spectral bands, one or more of signal-to-noise ratio, bit error rate, optical power level, and optical wavelength center frequency.

3. The method of claim 1, wherein:
the modulation pattern implements SONET STS-1 frames; and
the first and second signals represent specific bytes in the SONET frames.

4. A method of monitoring input light having a plurality of spectral bands, the method comprising:
during each of a plurality of successive time intervals corresponding to the plurality of spectral bands,
separating a different corresponding spectral band of the plurality of spectral bands from the plurality of spectral bands,
directing the separated spectral band to the photodetector while preventing the spectral bands other than the separated spectral band from reaching the photodetector, and
generating, with the wavelength-monitoring circuit, a signal representing a quality characteristic of a modulated or unmodulated pattern of light in the separated spectral band, the quality characteristic being one or more of signal-to-noise ratio, bit error rate, specific bytes in SONET frames, and optical wavelength center frequency.

5. Apparatus for monitoring input light having a plurality of spectral bands, the apparatus comprising:
an optical train that intercepts the input light and provides optical paths for routing the spectral bands;
a photodetector;
a routing mechanism that operates to direct selected spectral bands to said photodetector;
an electrical circuit coupled to said photodetector to provide a signal representing a quality characteristic of a modulated or unmodulated pattern of light impinging on said photodetector, the quality characteristic being one or more of signal-to-noise ratio, bit error rate, specific bytes in SONET frames, and optical wavelength center frequency; and
a control circuit coupled to said routing mechanism to cause only a first selected spectral band to be directed to said photodetector during a first time interval and to cause only a second selected spectral band to be directed to said photodetector during a second time interval, whereby said electrical circuit provides, during said first and second intervals, respective first and second signals representing quality characteristic for the first and second selected spectral bands.

6. The apparatus of claim 5, and further comprising:
an additional photodetector; and
an additional electrical circuit that provides a signal representing optical power of those spectral bands other than the selected band.

7. The apparatus of claim 5, wherein
said control circuit sequentially causes said routing mechanism to select each of the plurality of spectral bands so that the plurality of spectral bands are sequentially communicated to said photodetector in a round-robin fashion.

8. The apparatus of claim 5, wherein said optical train includes a dispersive element.

9. Apparatus for monitoring input light having a plurality of spectral bands, the apparatus comprising:
an optical train that intercepts input light and provides optical paths for routing the spectral bands, wherein said input light is subject to a modulation pattern that implements SONET STS-1 frames;
a photodetector;
a routing mechanism that operates to direct selected spectral bands to said photodetector;
an electrical circuit, coupled to said photodetector, that provides a signal representing specific bytes in the SONET frames of said modulated pattern of light impinging on said photodetector; and
a control circuit coupled to said routing mechanism to cause only a first selected spectral band to be directed to said photodetector during a first time interval and to cause only a second selected spectral band to be directed to said photodetector during a second time interval, whereby said electrical circuit provides, during said first and second intervals, respective first and second signals representing specific bytes in the SONET frames for the first and second selected spectral bands.

10. Apparatus for monitoring input light having a plurality of spectral bands, the apparatus comprising:
an optical train that intercepts the input light and provides optical paths for routing the spectral bands;
a photodetector;
a routing mechanism that includes a plurality of dynamically configurable routing elements corresponding to the plurality of spectral bands, each routing element having first and second states, said first state causing that routing element to direct its respective spectral band to said photodetector, said second state causing that routing element to direct its respective spectral band so as not to teach said photodetector; and
an electrical circuit coupled to said photodetector to provide a signal representing a quality characteristic of a modulated or unmodulated pattern of light impinging on said photodetector; and
a control circuit coupled to said routing mechanism to cause only a first selected spectral band to be directed to said photodetector during a first time interval and to cause only a second selected spectral band to be directed to said photodetector during a second time interval, whereby said electrical circuit provides, during said first and second intervals, respective first and second signals representing the quality characteristic for the first and second selected spectral bands, wherein
said control circuit sequentially selects each routing element in a desired subset of the plurality of routing elements so that the corresponding subset of spectral bands are sequentially communicated to said photodetector in a round-robin fashion, whereupon the spectral bands in said subset of spectral bands are monitored for quality by said electrical circuit and spectral bands not in said subset are not monitored for quality by said electrical circuit.

11. The apparatus of claim 10, wherein:
said second state of each of said routing elements causes that routing element to direct its respective spectral band to a common location.

12. The apparatus of claim 11, and further comprising an additional photodetector that generates a signal representing optical power of light impinging on said common location.

13. The apparatus of claim 10, wherein at least one of said dynamically configurable elements is a rooftop prism whose position can be changed to define said first and second states.

14. The apparatus of claim 10, wherein at least one of said dynamically configurable elements includes a mirror whose orientation can be changed to define said first and second states.

15. The apparatus of claim 12, further comprising an additional electrical circuit that is connected to said additional photodetector and computes the total optical power incident on said additional photodetector and sets a threshold for triggering a fault condition if said optical power falls below said threshold.

16. A system for monitoring light having a plurality of spectral bands and traveling along an optical fiber, the system comprising:
   a wavelength monitor;
   a coupler that directs a fraction of light traveling on said fiber to said wavelength monitor;
   said wavelength monitor including:
      an optical train that intercepts light directed to said wavelength monitor by said coupler and provides optical paths for routing the spectral bands;
      a photodetector;
      a routing mechanism that operates to direct selected spectral bands to said photodetector;
      an electrical circuit coupled to said photodetector to provide a signal representing a quality characteristic of a modulated or unmodulated pattern of light impinging on said photodetector; and
      a control circuit coupled to said routing mechanism to cause only a first selected spectral band to be directed to said photodetector during a first time interval and to cause only a second selected spected band to be directed to said photodetector during a second time interval, whereby said electrical circuit provides, during said first and second intervals, respective first and second signals representing the quality characteristic for the first and second selected spectral bands; and
   a management processor that receives information based an said signal representing a quality characteristic.

17. Apparatus for monitoring at least one characteristic of input light having a plurality of spectral bands, the apparatus comprising:
   an optical train that intercepts the input light and provides optical paths for routing the spectral bands;
   first an second photodetectors;
   a plurality of dynamically configurable routing elements corresponding to the plurality of spectral bands, each routing element having first and second states, said first state causing that routing element to direct its respective spectral band to said first photodetector, said second state causing that routing element to direct its respective spectral band to said second photodetector;
   a first electrical circuit coupled to said first photodetector to provide a signal representing a quality characteristic of a modulated or unmodulated pattern of light impinging on said first photodetector;
   a second electrical circuit coupled to said second photodetector to provide a signal representing optical power of light impinging on said second photodetector; and
   a control circuit coupled to said routing elements operating
      (a) to cause, during a first time interval, a first selected one of said routing elements corresponding to a first selected spectral band to assume said first state while causing the routing elements other than said first routing element to assume said second state; and
      (b) to cause, during a second time interval, a second selected one of said routing elements corresponding to a second selected spectral band to assume said first state while causing the muting elements other than said second rounding element to assume said second state;
   whereby
      said first electrical circuit provides, during said first and second intervals, respective first and second quality characteristic signals representing the quality characteristic for said first and second selected spectral bands, and
      said second electrical circuit provides, during said first interval, a first optical power signal representing the optical power of the spectral bands other than said first selected spectral band, and during the second interval, a second optical power signal representing the optical power for the spectral bands other than said second selected spectral bands.

18. The apparatus of claim 17, wherein said first electrical circuit provides a signal representing, for each selected spectral band, one or more of signal-to-noise ratio, bit error rate, optical power level, and optical wavelength center frequency.

19. The apparatus of claim 17, wherein said control circuit sequentially selects each routing element in the plurality of routing elements so that the plurality of spectral bands are sequentially communicated to said first photodetector in a round-robin fashion.

20. The apparatus of claim 17, wherein said control circuit sequentially selects each routing element in a desired subset of the plurality of routing elements so that the corresponding subset of spectral bands are sequentially communicated to said first photodetector in a round-robin fashion, whereupon said subset of spectral bands are monitored for quality by said first electrical circuit and spectral bands not in said subset are not monitored for quality by said fast electrical circuit.

21. The apparatus of claim 17, wherein said first photodetector is a PIN photodiode or an avalanche photodiode.

22. The apparatus of claim 17, wherein said optical train includes a dispersive element.

23. The apparatus of claim 17, wherein at least one of said dynamically configurable elements is a rooftop prism whose position can be changed to define said first and second states.

24. The apparatus of claim 17, wherein each of said dynamically configurable elements includes a mirror whose orientation can be changed to define said first and second states.

25. The apparatus of claim 17, wherein said second electrical circuit connected to said second photodetector computes the total optical power incident on said photodetector and sets a threshold for triggering a fault condition if said optical power falls below said threshold.

26. The apparatus of claim 19, in a system that further includes:
   a coupler that directs a fraction of light traveling on a fiber to be monitored to said optical train; and
   a management processor that receives information based on said signal representing a quality characteristic.

27. A method of monitoring light having a plurality of spectral bands and traveling along an optical fiber, the method comprising:
   using a coupler to direct a fraction of light traveling along the fiber away from the fiber, and, with respect to the light directed away from the fiber;

during a first time interval,
- separating a first spectral band of the plurality of spectral bands from the plurality of spectral bands,
- directing the first spectral band to a photodetector while preventing the spectral bands in the plurality of spectral bands other than the first spectral band from reaching the photodetector, and
- generating, with a wavelength-monitoring circuit that is coupled to the photodetector, a first signal representing a quantity characteristic of a modulated or unmodulated pattern of light in the first spectral band; and thereafter, during a second time interval,
- separating a second spectral band of the plurality of spectral bands from the plurality of spectral bands,
- directing the second spectral band to the photodetector while preventing spectral bands in the plurality of spectral bands other than the second spectral band from reaching the photodetector, and
- generating, with the wavelength-monitoring circuit, a second signal representing a quality characteristic of a modulated or unmodulated pattern of light in the second spectral band; and providing the information based on the first and second signals representing a quality characteristic to a management processor.

28. The method of claim 28, and further comprising, during the first time interval, generating a first power signal representing combined optical power of the spectral bands other than the first spectral band.

29. A method of monitoring input light having a plurality of spectral bands, the method comprising:

during a first time interval,
- separating a first spectral band of the plurality of spectral bands from the plurality of spectral bands,
- directing the first spectral band to a photodetector while preventing the spectral bands in the plurality of spectral bands other than the first spectral band from reaching the photodetector, and
- generating, with a wavelength-monitoring circuit that is coupled to the photodetector, a first signal representing a quality characteristic of a modulated or unmodulated pattern of light in the first spectral band, the quality characteristic being one or more of signal-to-noise ratio, bit error rate, and optical wavelength center frequency; and thereafter, during a second time interval,
- separating a second spectral band of the plurality of spectral bands from the plurality of spectral bands,
- directing the second spectral band to the photodetector while preventing spectral bands in the plurality of spectral bands other than the second spectral band from reaching the photodetector, and
- generating, with the wavelength-monitoring circuit, a second signal representing the quality characteristic of the modulated or unmodulated pattern of light in the second spectral band.

30. The method of claim 29, and further comprising during the first time interval, generating a first power signal representing combined optical power of the spectral bands other than the first spectral band.

* * * * *